Patented Mar. 16, 1937

2,073,616

UNITED STATES PATENT OFFICE 2,073,616

GALACTAN PRODUCT AND PROCESS OF MAKING SAME

Solomon F. Acree, Washington, D. C., assignor to Arthur B. Foster, Washington, D. C.

No Drawing. Application July 15, 1927, Serial No. 206,051. Renewed June 10, 1936

32 Claims. (Cl. 127—30)

This invention relates to the extraction of soluble carbohydrate constituents from woods and other vegetable materials, particularly western larch and agricultural wastes, for the production of organic compounds and leaving the cellulosic residue in a condition suitable for its subsequent use for the production of paper pulp fiber board and the like. The invention relates also to the fractional extraction of such soluble constituents by means of hot water or dilute acids or alkalies and the removal of tannins, colored and colloidal materials, and other impurities from the extracts by means of recoverable flocculating and clarifying agents, and the evaporation of water therefrom as by vacuum distillation and spray drying to recover the dehydrated extracts. The specification will also describe the hydrolysis of the soluble matters, as an optional step, and the conversion thereof into other products.

Western larch wood, particularly the heavy butts thereof occurring as waste in lumbering operations, contains up to 20–25 percent of a gummy material consisting chiefly of a galactan which can be easily extracted from the chipped or shredded or otherwise comminuted wood with hot water or dilute acids or alkalies. Various annual agricultural wastes such as cornstalks, cotton seed hulls and the like contain considerable amounts of xylan, and, in common with larch, also various gums, colored substances, such as tannins, and hemicelluloses which on hydrolysis yield glucose, mannose and other sugars. The galactan, xylan, gums, hemicelluloses, etc. are fractionally soluble in water, dilute acids, and in alkaline solutions from which they can be in part precipitated and recovered by acidification with sulphuric, concentrated carbonic or other acids. My processes therefore permit the fractional separation of these complex carbohydrates from larch wood and agricultural waste cellulose fibers by first extracting the more soluble portions such as galactan, tannins, and more soluble gums and xylans with hot water or dilute acid or alkali; I thereby increase the percent of less soluble complex xylan and other hemicellulose carbohydrates in the fibers which can be separated in subsequent extractions with water, acids or alkalies.

In other pending applications I have shown that such a galactan extract is useful in itself and for making purified galactan, galactose, alcohol, and galactonic, mucic, oxalic, saccharic, pyromucic and allo- and talo-mucic acids. This gummy material makes it necessary to use more chemicals and somewhat different and more drastic operating conditions in producing pulp from the unextracted larch wood chips by the soda, sulphate and sulphite processes. But by the present invention I am enabled to remove the gummy galactan and other soluble materials and obtain them in a form more suitable for purification and for making other chemicals therefrom. At the same time the extracted larch chips are left in a heated, porous condition much more suitable than unextracted larch chips for making excellent pulp, paper, fiber board and the like with less drastic cooking conditions and less chemicals in the soda, sulphate and sulphite processes.

The following more detailed description gives one embodiment of my invention but it is understood that other related methods may be used to bring about substantially the same results.

Referring first to larch or other galactan bearing wood the butt logs are split or sawed and slabbed into suitable form and size and then run through a mechanical chipper and shredder to give chips suitable for extraction and pulping operations. The comminuted wood (say in the form of chips) is best extracted with water in a series or battery of extraction cells with false bottom strainers to draw off the liquor from the chips and circulate it, the cells being made of enduro or other high chrome-steel acid resisting material, or of steel shells with acid proof inlet and outlet doors and other exposed fittings and lined with acid proof bricks and binding cement, or of larch wood staves with acid proof enduro, duriron or other inlet and outlet doors and other exposed fittings, or made simply of steel, depending upon whether dilute acid or water is used as the extracting agent. When water is used there is so little acid extracted from the larch wood that wrought iron or steel shells or larch wood cells with ordinary cast steel inlet and outlet doors made tight with rubber gaskets may be used to great advantage. The hot liquors are circulated by a pump through a preheater and back into the top of the same cell or into the next cell. The larch stave cells are conveniently made at the plant in any desired size and shape and are cheap and efficient. Each lot of wood can be extracted about one hour in each extracting step, with successively weaker extracts from preceding charges of wood, and finally with water, by the counter current method described in my earlier applications. By thus treating the fresh chips with the strongest preceding extract and the final chips with water I most effectively remove the soluble constituents from the wood chips and at the same time secure the most concentrated galactan extracts and thereby save some evaporation costs. The hot, porous chips can now be removed to another digester or left in the same digester, when it is suitable, and either first freed of water by evacuating the digester or treated directly with the soda, sulphate or sulphite liquors. The charge is cooked by any approved manner to convert the chips into pulp.

The preliminary galactan extracts formed prior to the pulp cook referred to above will have varying compositions depending upon the method of extraction and will therefore require different treatments for the several uses thereof. Water may be used as the extractive solvent or dilute acids such as sulphuric, nitric, hydrochloric, hydrobromic, sulphurous acid or its salts. The concentration of the acid will vary with the temperature and with the time of extraction desired and also with the desired degree of hydrolysis of the complex wood or vegetable hemicelluloses and cellulose and of the galactan into galactose. These factors must be so regulated that the cellulose is not hydrolyzed or hydrated sufficiently to weaken it when made into finished pulp and paper. To effect these results I find that the temperature in the extraction battery may vary from about 90° C. or 100° C. up to 160° C. or higher, about 3 to 4 parts by weight of the extracting liquid being necessary to cover each part of the wood chips. The concentration of the acid solution may vary from 1 per cent or less up to 2.5 per cent, the concentration of the acid needed decreasing with the rise in temperature and with the length of digestion. I find, for example, that 3 or 4 successive extractions of each lot of wood with 3–4 parts of 1–2.5 per cent sulphuric acid at 100° C. for a period of 1–2 hours at each extraction will remove practically all of the galactan and some other sugars such as mannose, glucose, xylose and other sugars arising from hydrolysis of hemicelluloses etc. At 130° C. to 140° C. in an autoclave I may use only a 0.5 per cent solution of sulphuric acid or less.

During this extraction of the galactan with acids at the above named concentrations, temperatures and time periods, the tannins and dark colloidal wood and bark particles are flocculated and thrown out of solution or precipitated in the wood chips. When such solution is withdrawn from the chips and filtered it is found to be very light colored because of this removal of the tannins and colloidal wood particles. It may then be finally clarified with Norit or other decolorizing carbons, neutralized with lime to about pH 8–9 and filtered from the precipitated magnesium hydroxide and the calcium sulphate formed when sulphuric acid is used as the hydrolytic agent, treated with an oxalate to remove the residual calcium, filtered, decolorized when necessary and evaporated in a vacuum pan or spray dryer to form a concentrated solution or solid residue of galactan or galactose. The relative amount of galactan and galactose found in the extract varies widely: Low acid concentrations and short time periods give chiefly galactan, whereas 2.5 per cent sulphuric acid at 120° C. for 5 hours will give chiefly galactose.

When water is used as the solvent I find that galactan, tannins, dark colloidal wood particles and other materials are removed from the wood and any associated bark. I may filter and evaporate such extract directly in a vacuum pan to a syrup or molasses of 80 per cent concentration or higher and then concentrate this syrup further as in a drum dryer or spray dryer to obtain a crude sticky paste or a taffy or solid galactan for use as a gum or adhesive or for oxidation into galactonic or mucic acid. But I may also purify this crude galactan in the following ways. The hot dilute or concentrated crude galactan solution may be treated with aluminum hydroxide or aluminum sulphate and the acidity or reaction of the solution adjusted, as with lime and sulphuric acid, to a pH of about 5 to 6.5 and preferable at about 5.8. At this pH of 5.8 the true acidity or hydrogen ion concentration is $\frac{1}{10}^{5.8}$ or about 0.0000016 gram per liter. At this pH the aluminum hydroxide flocculates out and brings down the tannins and colloidal wood particles and any undissolved oily or gummy material and clarifies the solution. It is well known that western larch and other conifers contain volatile essential oils vaporized by steam. I find that the addition of about 1 per cent of a good decolorizing charcoal like Norit or Filtcher at this stage or later assists very materially in clarifying this galactan solution. The amount of the aluminum compound needed varies with the concentration of the tannin and colloidal materials, but an excess is desirable and is not lost because it is recovered as follows. The aluminium hydroxide-tannin sludge is filtered off, incinerated and the aluminium oxide is recovered and dispersed in a colloid mill and reused in more crude galactan solution for clarification, or converted into aluminium sulphate or hydroxide and reused as above to remove more tannins from galactan solutions. Or the sludge may be treated with a solution of about 1–5 per cent of sulphuric acid and boiled to precipitate the tannins, etc., and convert the aluminium hydroxide back into aluminium sulphate which is then filtered from the flocculated tannins and used over again as above. Final traces of calcium salts left in the galactan solution may be removed by the addition of suitable quantities of oxalic acid and oxalates to adjust the galactan solution to any desired pH and precipitate the calcium as oxalate, followed by settling, filtration, centrifuging or other means which will give a substantially purified galactan solution. The purified galactan extract may now be evaporated in vacuum and spray dried or vacuum-drum dried to a very light yellow colored galactan taffy or gum which is somewhat powdery when very pure and dry. In this mode it is easy to secure a purity of 75 to 80% or even more. This galactan, especially the purified form, has been found useful for making adhesives, for postage stamps, paper wrapping ribbon, wall paper, corrugated box boards, etc.; it is also useful like gelatine, gum Arabic, etc., in making colloidal solutions and food and medicinal emulsions such as ice cream, inks, cod liver oil and castor oil emulsions, lubricating oil emulsions, foaming solutions for making cellular concrete or gypsum, etc. This purified galactan is used for making pure galactose by hydrolysis with about 1 per cent oxalic or sulphuric acid or hydrochloric acid, for making pure galactonic and mucic acids and for making nitrated products for use as explosives, etc.

Another method of purifying and using the crude liquid or solid galactan is the following. If the concentrated or spray dried or drum dried galactan has been heated sufficiently to convert the tannins into insoluble phlobaphene or "red" or tannin anhydride, this "red" and other flocculated colloidal materials will remain undissolved when the extract is treated with more water or especially with boiling dilute 1-2.5 per cent sulphuric or other mineral acid about 1 hour, and can be filtered off. If 1 per cent or more of a good decolorizing carbon like Norit is added, the concentration of the acid may be cut down to 0.15 per cent to 0.5 per cent and the time of heating lowered to perhaps 30 minutes, especially if the solution is heated in an autoclave to a temperature of 120° C. up to 160° C. Under the less drastic conditions there is a very little hydrolysis of the galactan to galactose; when desired, however, the higher concentration of acid, longer time and higher temperatures may be used to precipitate the tannins and wood colloids and convert the galactan simultaneously and practically completely into galactose sugar. The precipitated tannins, etc., are filtered off, the sulphuric or other acid neutralized, as with lime, and filtered, the remaining calcium is precipitated with oxalates and filtered, and the purified galactan or galactose solution is clarified with decolorizing charcoal when necessary and evaporated in a vacuum pan or spray dryer to form a concentrated solution or solid residue of galactan or galactose. The concentrated galactose solutions crystallize well when seeded with pure galactose crystals and manipulated as in the granulating pans of the sugar refinery or when cooled and allowed to stand and crystallize. The crystallization is assisted by the addition of alcohol or glacial or nearly glacial acetic acid in amount just short of that precipitating some of the sugar as a gum or molasses; on standing the solution crystallizes well, is filtered from the practically pure galactose and the filtrate is further concentrated and again subjected to this crystallization treatment to recover more galactose. The alcohol and acetic acid are recovered and used again. Any of these methods for making galactose from galactan permit the manufacture of galactose as a cheap article of commerce for the first time, the older methods of making galactose from milk sugar being very expensive.

The galactan and galactose extracts are suitable for further treatment for the production of ethyl alcohol by means of a specially developed yeast grown on increasing concentration of galactose.

But these extracts are also especially suitable for oxidation into galactonic, mucic and oxalic acids. Even the crude galactan or galactose extract containing tannin, dark colored colloids, etc., may be used, but the above described purification step gives a purified galactan or galactose product which is especially suitable for oxidation into very pure galactonic, mucic and oxalic acids.

It is understood that I do not limit to larch or other woods my method of making soluble extracts of carbohydrate and cellulosic materials, converting the cellulosic residue to soda, sulphite or sulphate or other pulp and paper products, and converting the extracts into solids or gums or subjecting them to fermentation or chemical changes to produce chemicals and other articles of commerce. Whereas larch contains a large amount of galactan and small quantities of xylans, in common with other woods, the agricultural wastes contain large amounts of xylans and only small amounts of galactans. But my methods apply both to woods and to annual agricultural wastes. For example, my method includes making aqueous extracts, or about 0.25-3 per cent caustic soda extracts, or about 0.25-2.5 per cent sulphuric or nitric or phosphoric or other acid extracts of the pentosan gums of kapok, corncobs and stalks, cotton seed hulls and stalks and burrs, various straws, peanut hulls, bagasse, oat hulls and other waste farm products by subjecting them to dry cooks or my battery liquid cook at 85°-160° C. or higher. The residual cellulosic material is washed and used to make pulp, or is hydrolyzed with concentrated sulphuric or hydrochloric acid followed by dilution and heating to form glucose or other products, or is oxidized into oxalic acid, or is partially hydrolyzed, neutralized and used as a cattle food. The aqueous pentosan extracts may be obtained by covering the coarsely comminuted pentosan-containing material with about four parts of water and digesting it about one hour at 135°-160° C. in digester; a concentrated extract may be best obtained by using my battery process and subjecting each lot of materials to several extractions, the fresh water entering and washing the most nearly completely extracted material in the last cell which is then emptied and refilled with fresh material, while the solution flows through successively richer materials and finally through fresh pentosan-containing cellulosic material to give the richest extract. The concentrated extract may be used as such, or may be freed from suspended colloidal and tanning material as with galactan by treatment with aluminum hydroxide or sulphate and adjusting the pH value with lime, for example, at about 5.8 and filtering, or by direct regulation of the pH value to cause flocculation without precipitating an added coagulating agent like aluminum sulphate or hydroxide. These crude and especially the purified xylan extracts are then vacuum and/or spray dried to form gums for use as binders in diatomaceous earth bricks, coal briquettes, etc., as adhesives for wall paper, envelopes, etc., as emulsifying agents in ice creams, cod liver and mineral oil emulsions or for hydrolysis or oxidation. When the gum is hydrolyzed directly 1-4 hours with about 1-2 per cent sulphuric acid at about 100°-130° C., neutralized with lime, filtered, de-limed with oxalic acid, filtered, etc., it gives a purer pentose such as xylose than does the direct hydrolysis of the cellulosic product; in the latter case the pentosan may be hydrolyzed to the xylose completely but other products such as glucose, mannose, galactose, etc., are also formed depending upon the composition of the raw material and the degree of hydrolysis just as acid extraction of larch gives both galactose and mannose, glucose, xylose and other products. The purified xylose solution made from the gum is used as such, or is dehydrated in a vacuum pan and spray dried to form a solid xylose, or the thick molasses (80-95 per cent) is allowed to crystallize and form very pure xylose; the addition of alcohol or glacial acetic acid assists in the crystallization and these solvents are recovered and reused. When this sugar is centrifuged and dried or crystallized again, etc., it forms a pure white sugar not quite as sweet as cane sugar. It should be useful for diabetic patients, cattle food, and for making furfural, xylonic and xylotrioxyglutaric acids, pyromucic acid, and for fermentation into lactic and acetic acids, or acetone and alcohol. The residual molasses from the crystallization of the xylose and recovery and reuse of the alcohol or acetic acid may be added to more of the original xylose solution or used in one of the preceding ways.

Instead of extracting a large amount of the xylan gum from these chemical pentosan-containing materials, a smaller amount may be fractionally extracted with water or dilute acid or alkali at a lower temperature in a shorter time, especially if 0.2–1 per cent caustic soda is used at about 100° C. Two per cent ammonia may be used and recovered by distillation and reused. In the latter case the caustic may be neutralized with carbonic acid or with sulphurous or sulphuric acid and the gum and other materials partly precipitated and recovered.

This procedure is desirable when an alkaline gum or pentosan glue is needed, as for mixing with animal or fish glues or casein or algin or alginic acid to make adhesives or form compounds for cellular cement or gypsum products or flotation, or paper or cloth sizings, etc. When only a smaller amount of pentosan is thus fractionally extracted, the cellulosic residue, from corncobs and peanut hulls especially, gives excellent yields of pure crystalline xylose when hydrolyzed 1–4 hours at 120°–130° C. with 1–2.5 per cent sulphuric acid in the same enduro or other acid proof digesters in which the aqueous or alkaline extracts were first made from the material. The sulphuric extract is removed from the cellulosic residue, neutralized with lime, filtered from calcium sulphate, freed from last traces of calcium by means of oxalic acid, filtered, evaporated to a syrup and crystallized by seeding with xylose crystals and adding alcohol when desired. In this way yields of 10–12 per cent or more of pure xylose can be made easily. The alcohol is recovered and reused. The xylose syrup residues are used as indicated above. The gum previously extracted and the cellulosic residue are used like the similar products obtained by the other methods herein described. The use of the caustic soda in different concentrations and at different temperatures and time periods permits the fractional extraction of certain gums, the more acid being extracted first, etc., and therefore permits of preparation of gums of varying properties while at the same time freeing the pentosan-containing material of gummy substances that contaminate the xylose and prevent its crystallization.

But instead of making an alkaline or aqueous extract, the pentosan may be treated with 0.5–2.5 per cent sulphuric, nitric, hydrochloric, sulphurous, phosphoric or oxalic or other acids, or calcium, magnesium or sodium bisulphite at 100°–130° C. or higher to form a pentose (xylose) extract and leave a cellulosic residue suitable for making pulp and alpha cellulose for rayon manufacture or for hydrolysis into glucose or oxidation into oxalic acid, for use as a cattle food. Instead of separating the aqueous sugar solution from the comminuted cellulosic residue the entire mass may be used as such as ensilage for cattle or the sulphuric or phosphoric or nitric acid may be partially or wholly neutralized with ammonia, soda or lime to form salts that are afterward found in the animal manure as excellent fertilizer. The neutralized mixture may be put up in silos or dried and shipped and fed as a solid. The presence of the sugars xylose and glucose, etc., make the mixture sweet and very palatable to cattle and the softened cellulose fibers have an agreeable consistency more like green ensilage. This artificial ensilage may also be mixed with cotton seed cake, peanut cake, soy bean cake, etc., to furnish nitrogenous constituents to make a well balanced food. Any kind of waste pentosan material such as corncobs and stalks, various straws, cottonseed stalks, hulls and burrs, peanut hulls, etc., may be treated in this way.

But the concentrated xylose extract formed in the acid digestion of the pentosan material by my liquid cook battery method above described may be run off from the cellulose residue as in my larch processes. It may be spray dried in the acid or neutralized state and the crude xylose sugar may be highly purified by crystallization, or it may be used as a cattle food, or for fermentation or for oxidation or for conversion to furfural by super-heated steam or acid solutions.

Instead of disrupting the fibers of the raw cellulosic materials such as western larch wood or peanut hulls in a beater, as indicated above, the fibers may be separated as follows. A batch of the fibrous material may be placed in a high pressure autoclave and treated with steam at a temperature of 130°–175° C. for a short time such as ¼ to 2 minutes to hydrolyze and soften the gummy materials. The steam pressure is then increased very materially such as to three hundred to eight hundred pounds for a few seconds to increase the concentration of the gaseous steam within the mass of the cellulosic material. When the pressure is suddenly released in the high pressure autoclave the steam within the cellulosic material at the high pressures above mentioned blows the cellulosic, softened particles entirely apart into the individual fibers and adhering carbohydrate constituents. The volume of steam and fibers is collected in a settling compartment and the steam may be used for heating purposes or for obtaining power. The fibers are collected together with admixed water and may be extracted with hot water or with dilute acid or dilute alkali to remove any galactan, xylan or hydrolyzed sugars. Such extracted material is useful for making a xylan and a galactan adhesive, as indicated above, galactose, galactan or xylose and chemicals therefrom. The fibrous material may now be given a pulp cook with for example 6–10 per cent or even higher concentration of caustic soda to form large yields of cellulose, alpha cellulose predominating.

The present case is a continuation in part of the following copending cases: Serial Number 160,909 filed April 10, 1917 (renewed as Serial Number 458,133 on April 2, 1921), now matured into Patent No. 1,816,135; applications Serial Numbers 368,640½ and 368,641½ filed March 25, 1920, and matured into Patent Number 1,816,136 and 1,816,137 respectively; and application Serial Number 599,708 filed November 8, 1922 and matured into Patent Number 1,816,138.

Having thus described my invention, what I claim is the following:

1. A substantially dehydrated galactan from western larch wood freed from tannins, oils, bark and colloids but containing some of the other soluble materials from the western larch.

2. A composition comprising purified galactan and other soluble materials from western larch, freed from tannins, oils and colloids.

3. A substantially dry galactan admixed with other soluble constituents derived from western larch and of a purity of at least about 75%, substantially free from tannins, oils and bark.

4. Dry white galactan admixed with other soluble constituents derived from western larch and substantially free from tannins, oils and bark and of at least 75% purity.

5. A process of obtaining dry galactan from cellulosic material containing the same, which comprises leaching the said material with water and removing the tannins, oils and bark and concentrating the extract by removal of water.

6. A process of obtaining galactan from cellulosic material containing the same, which comprises leaching the said material with water and concentrating the extract by removal of water and further concentrating the extract by spray drying, and subjecting the spray dried solid to sufficient heat to render the tannins and colloidal material insoluble.

7. A process of obtaining galactan from western larch waste, which comprises leaching the said material with water, removing the tannins, oils and bark, and concentrating the extract to dryness by removal of water.

8. A process of obtaining galactan from cellulosic material containing the same, which comprises leaching the said material with water, separating tannins, oils and bark with a flocculating agent, and concentrating the extract to dryness by removal of water.

9. A process of obtaining galactan from cellulosic material containing the same, which comprises leaching the said material with water, separating tannins, bark and other colloidal matter with a flocculating agent at an adjusted pH value, and concentrating the extract by removal of water.

10. A process of obtaining galactan from cellulosic material containing the same, which comprises leaching the said material with water at above 90° C. for several hours, removing tannins, oils, and other colloidal matter with a flocculating agent at an adjusted pH value, and concentrating the extract by removal of water.

11. A process which comprises repeatedly extracting with aqueous liquors of successively changing concentration in organic extractives, a material selected from the herein described class consisting of western larch material, kapok, corncobs, cornstalks, cotton-seed stalks, hulls and burrs, straws, peanut hulls, bagasse, oat-hulls and other waste farm products containing cellulose as a base, such extractions being performed at about 85 to 160° C., whereby carbohydrates and other products are extracted from such materials, removing tannins, oils, bark and other colloidal matter with a flocculating agent at an adjusted pH value, and thereafter concentrating the extracts at least to the condition of a thick liquid mass by removal of water therefrom.

12. In the treatment of solutions produced by leaching western larch, the herein described mode of removing tannings from such solutions which comprises adding an aluminum salt and bringing the pH value of the solution to about 5 to 6.6, whereby aluminum hydroxide is precipitated, which drags down tannins from the liquor.

13. In the treatment of solutions produced by leaching western larch, the herein described mode of removing tannins from such solutions which comprises adding an aluminum salt and thereafter precipitating aluminum hydroxide in the liquor to drag down tannins, colloidal matters, etc.

14. A process of treating solutions extracted from western larch to remove tannins from solution, which comprises heating such solutions with acid equivalent to 0.15 to 0.5% of sulphuric acid under pressure to about 120–160° C., and separating the precipitated tannins.

15. A process of purifying galactan solutions containing tannin by boiling under pressure with sulphuric acid of below 0.5% concentration until a large part at least of the tannin is precipitated, whereby not more than a minor fraction of the galactan is hydrolyzed.

16. A process which comprises leaching western larch waste material with an aqueous liquid to give a liquid containing galactan and tannin, and thereafter removing tannin from said liquid by a flocculating reaction at an adjusted pH value.

17. A process of obtaining galactan from cellulosic material containing the same, which comprises leaching the said material with an aqueous liquid, and spray drying the extract sufficiently to flocculate the contained colloidal materials.

18. A process of obtaining galactan from cellulosic material containing the same, which comprises leaching the said material with an aqueous liquid, removing tannins therefrom and spray-drying the purified extract.

19. The process of purifying a crude galactan from western larch, containing tannin, which comprises heating said material without added chemicals sufficiently to convert the tannins into substantially insoluble tannin anhydride and extracting the galactan from the mass.

20. The process of purifying a crude galactan from western larch, containing tannin, which comprises heating said material without added chemicals sufficiently to convert the tannins into substantially insoluble tannin anhydride and concentrating the purified galactan to a powdered state by evaporation of water.

21. The process of purifying a crude galactan from western larch, containing tannin, which comprises heating said material without added chemicals sufficiently to convert the tannins into substantially insoluble tannin anhydride and thereafter heating such material with a dilute acid solution in which the tannin anhydride is insoluble.

22. A process which comprises leaching western larch waste material with an aqueous liquid to give a liquid containing galactan and tannin, thereafter removing tannin from said liquid and spray-drying the so purified galactan solution to produce a solid finely divided easily soluble galactan.

23. A process of purifying crude galactan solution containing tannin, which comprises treating such solution with an aluminum salt, the mixture being adjusted at pH 5.0 to pH 6.5 to flocculate aluminum hydroxide and drag down suspended organic matter including tannins, and filtering the remaining liquid.

24. In the treatment of solutions produced by extracting western larch the herein described steps comprising regulation of the pH value of the solution and addition of a chemical capable of precipitating tannins, colloidal matter, etc., at the regulated pH value, further clarifying the solution with a decolorizing carbon, and concentrating and spray drying the extract sufficiently to form a powder.

25. In the purification of solutions produced by extracting galactan-, colloid- and tannin-containing vegetable materials, the herein described steps comprising regulation of the pH value of the solution and addition of chemicals capable of precipitating tannins, colloidal materials, etc., at the regulated pH value.

26. In the treatment of solutions produced by extracting western larch the herein described steps comprising addition of an aluminum salt and regulation of the pH value by means of lime and sulphuric acid whereby aluminum hydroxide and calcium sulphate are precipitated and remove tannins, colloids, inorganic matter, etc., from the solution.

27. In the process claimed in claim 25 the step of recovery of the chemicals capable of precipitating tannins, colloidal materials, etc., by incineration and leaching, and re-use of such chemicals for precipitating more tannins and colloidal material.

28. In the process claimed in claim 26 the step of recovery from the tannin sludge of an aluminum compound capable of precipitating tannins and colloidal materials, by leaching with sulphuric acid, and cyclic re-use of such aluminum compound in such stated precipitations and recoveries.

29. A process which comprises leaching a cellulosic vegetable material containing substantial amounts of galactan and tannins with a hot aqueous solvent liquid, removing tannins from the extract, and concentrating said extract by the removal of water therefrom.

30. A process which comprises leaching a cellulosic vegetable material containing substantial amounts of galactan and tannins with a hot aqueous solvent liquid, removing tannins from the extract, and concentrating said extract by the removal of water therefrom and spray drying said extract, whereby oily constituents of the extracts are removed.

31. The process of producing fractionated organic extractives from a material selected from the herein described class consisting of western larch material, kapok, corncobs, cornstalks, cotton stalks and burrs and cotton-seed hulls, straws, peanut hulls, bagasse, oat hulls and other waste farm and annual products containing cellulose as a base, which comprises the steps of extracting more soluble organic and colored material with an aqueous extractive to give a residue richer in less soluble extractible complex carbohydrate, digesting the enriched cellulose residue with a hot aqueous extractive capable of dissolving the complex carbohydrate, separating the extract liquors from the fibers, and thereafter subjecting the extract to purification including the removal of tannins and colloidal and coloring materials by flocculation and decolorization.

32. The process of producing fractionated organic extractives from a material selected from the herein described class consisting of western larch material, kapok, cornstalks, corncobs, cotton stalks and burrs and cotton-seed hulls, straws, peanut hulls, bagasse, oat hulls and other waste farm and annual products containing cellulose as a base, which comprises the steps of extracting the more soluble organic and colored material with a hot aqueous extractive to give a residue richer in less soluble extractible complex carbohydrate, digesting the enriched cellulose residue with a hot aqueous extractive capable of dissolving the complex carbohydrate, separating the extract liquors from the fibers and removing tannins and other impurities and clarifying the extract with a flocculating agent, and thereafter concentrating the extracts by removal of water and crystallizing out carbohydrate.

SOLOMON F. ACREE.